Patented Aug. 22, 1933

1,923,835

UNITED STATES PATENT OFFICE 1,923,835

SURFACING MATERIAL AND PROCESS OF PREPARING SAME

Zanvil C. Loebel, New York, N. Y., assignor to The Flintkote Company, Boston, Mass., a Corporation of Massachusetts No Drawing. Application December 15, 1928
Serial No. 326,419

4 Claims. (Cl. 91—70)

This invention relates to improvements in methods of artificially coloring comminuted mineral matter and particularly crushed mineral of a character suitable for surfacing prepared roofing material. Such granules are usually graded to pass a six mesh screen and be retained on a thirty-five mesh screen.

Mineral surfacing at present employed in the asphalt roofing industry comprises granules obtained chiefly from slates occurring in natural deposits, and while these deposits vary considerably in color, the present demand in the industry for granules of different colors is not adequately satisfied by these natural deposits. In order to meet the demand for granules of different colors, and to insure also uniformity in the supply of any given color, methods of artificially coloring granules have been proposed.

One procedure heretofore proposed is to impregnate the granule with a soluble salt that can be transformed by heat, or by reaction with other soluble salts into a colored powder. This procedure is objectionable, however, because the colored powder obtained by this means is quite frangible and readily rubs off and washes from the granule unless a temperature sufficient to induce incipient fusion is resorted to. Where heat below a fusing temperature is used to transform the soluble salt into pigment the temperature required for this purpose is generally so high as may affect injuriously the structure of the granule, inducing with certain types such as slate, porosity which leads to blistering in the finished roofing. Obviously also such heat treatment requires expensive equipment and involves large consumption of fuel and considerable loss of time in carrying the granule through such treatment.

Another procedure heretofore suggested is to coat the granules with dry pigment and then fix the pigment on the granules by covering the coated granules with a soluble silicate, such as sodium silicate, which is thereafter subjected to a retorting operation in order to insolubilize the silicate and cause it to bind the coloring to the surfaces of the granules. The high temperatures necessary to insolubilize the silicate in this procedure, however, make it rather expensive to carry out the process, and in addition, these high temperatures frequently lead to variations in the color of the final product unless very accurate control of the combustion conditions is exercised. In many instances also the structure of the granule is altered and thus the product is rendered less durable in actual use due to the effect of the high temperature treatment.

My invention is directed particularly to improvements in methods of the type last referred to, and aims to overcome the disadvantages inherent in such methods as heretofore practiced. I have discovered that the insolubilization of soluble silicate for the purpose of fixing the pigment to the granules can be accomplished essentially by chemical reaction rather than by roasting to dehydrate the silicate into an insoluble condition, and that by the selection of certain types of granules as the base, this reaction may be made to take place between the soluble silicate and certain constituents of the base, thus avoiding the use of unnecessary materials and permitting the process to be carried on at relatively low temperatures. By thus operating at low temperatures, the effect of the oxidizing or reducing character, and of the intensity of the flame as a factor in the color of the product is eliminated and the liability of injuriously affecting the structure of the granules is avoided.

For this purpose, I prefer to use crushed slag preferably basic, as the granular base to be colored. This material affords certain desirable advantages when used as a surfacing for prepared roofing, among these being its reactive nature; its porosity and consequent low apparent specific gravity; the roughness of its surface which enables it to become securely attached to coating asphalt when imbedded therein during the manufacture of the roofing, and the availability of the base at very low cost in numerous sections of the country.

In accordance with my invention I effect insolubilization of the soluble silicate by virtue of chemical interaction between the silicate and alkaline earth constituents of the slag material, forming insoluble complex silicates. The reaction may be permitted to take place at ordinary atmospheric temperatures, or the reaction may be promoted by heating the material at low temperatures, but in any event, the comparatively drastic, injurious, and costly high temperature treatment is entirely avoided in accordance herewith.

I have produced by my invention very attractive green colored granules, the coloring being highly resistant to washing and otherwise very lasting. This has been accomplished with the use of relatively small amounts of green chromium oxide pigment. About 0.5 to 0.9% of this pigment by weight on the basis of the slag granule to be colored is sufficient thoroughly and uniformly to coat the granules, although the amount of pigment actually used will depend upon the shade of green desired. The distribution of the pigment over the surfaces of the granules may be carried on by mixing the pigment in its dry condition with the dry granules, but preferably the granules, or the pigment or both, may be slightly wetted with water to facilitate rapid and uniform coverage. After the granules are thoroughly and evenly covered with the pigment, the mass is then wetted with about 6% of sodium silicate and agitated to cause the silicate to coat the pigmented granules. If desired, the pigmentation of the granules may be carried on simultaneously with the silicate treatment, by suspending the desired proportions of the pigment in the calculated amount of the silicate, diluting with water if necessary, and then stirring the granules in the suspension of pigment in silicate, until the granules are thoroughly coated with thin films of the suspension.

The pigmented and silicate coated granules may then be dried at room temperature for say 10 to 12 hours, during which time the silicate will react with calcareous constituents of the granular slag base and be transformed thereby into an insolubilized compound which serves to bind the pigment to the granules. The reaction may be assisted, if desired, by heating the coated granules in a suitable oven or in a kiln at about 212° F., more or less, in which event the time required for complete reaction to take place may be reduced to a relatively short period, depending upon the degree of agitation and exposure to warm air or gases.

By my invention I have produced also very satisfactory red colored granules of various shades by pigmenting crushed slag with varying amounts of red oxide of iron ranging from 1 to 3% and then treating the granules with sodium or potassium silicate which is then converted by its reaction with basic substances contained in the slag into an insoluble condition in which state it functions to bind the pigment to the granules.

I may also color the granules with a mixture of pigments, say ultramarine blue and yellow ochre, to obtain a resultant green which is then fixed to the granules by the silicate treatment as already described.

In any event however, it will be seen that by using a reactive granule as the base, the insoluble silicate resulting from the reaction of the soluble silicate with constituents of the base is an integral part of the granule, providing a more secure bond between the pigment and the granule than is the case where the insoluble silicate is wholly extraneous of the base. Furthermore, by providing a process of insolubilization of the silicate at low temperature, the shade of the product is made dependent essentially upon the amount of pigment employed and quite free and independent of the drying conditions that may be attained in the process.

Instead of coloring the granules with pigment as heretofore described, I may also produce a pigment in situ by impregnating the slag granules with soluble salts which are capable of reacting with one another to form a colored powder, which may then be fixed in place by the silicate treatments already described. Thus, for example, the granules may first be impregnated with a solution of lead acetate and then with a solution of sodium chromate, the materials reacting to produce a yellow lead chromate, the intensity of the yellow depending upon the relative concentrations of the reacting salts. The granules may then be dried in any convenient manner, and then subjected to the silicate treatment for fixing the yellow pigment in place.

Certain of the advantages of my invention may also be realized by producing the pigment in situ in the granules from a single salt solution introduced into the pores of the granules and transformed into a colored powder by heat treatment. For example, the slag granules may be impregnated with a solution of sodium chromate of desired concentration, the granules dried and heated to temperature say of about 1000° F. more or less, but in any case sufficiently high to transform the sodium chromate to chromic oxide of desired shade of green, whereupon the colored granules may be subjected to the silicate treatment at low temperature to fix the coloring in place.

It will be understood, that while I have specifically referred to slag granules as the base to be colored, the invention may be carried out and its novel features may be achieved by employing other bases which like the slag are reactive toward the silicate, or where the granular material is insufficiently reactive, basic powders such as calcium carbonate may be combined with the granules prior to the silicate treatment.

By the expression "low temperature insoluble reaction product" as used in the claims, I mean such reaction product as is formed at atmospheric or at normal drying temperatures, but in any event at temperatures not substantially in excess of say, 250° F.

I claim as my invention:

1. In a method of artificially coloring a granule containing sufficient calcareous constituents to react with water soluble silicates at temperatures not in excess of 250° F., those steps which consist in incorporating a pigment with the granular material, mixing the granular material with a water soluble silicate in the presence of water, and drying the thus treated granule at a temperature not in excess of 250° F. to insolubilize the coating whereby to bind the pigment to the granule.

2. In a method of artificially coloring a granule containing sufficient calcareous constituents to react with water soluble silicates at temperatures not in excess of 250° F., those steps which consist in incorporating a pigment with the granular material, mixing the granular material with a water soluble silicate in the presence of water, and drying the thus treated granule at a reaction temperature which will form a permanent unfused water insoluble non-weathering coating on the granule.

3. A method of coloring granules which consists in mixing crushed granular material with a substance that will react with soluble silicate to form an insoluble silicate, coating the granules with pigment, applying soluble silicate solution and drying the mixture by artificial heat above that of boiling water but below the point where the pigment will be injuriously affected by the heat.

4. A method of coloring granules which consists in mixing crushed granular material with a substance that will react with soluble silicate to form an insoluble silicate, coating the granules with pigment, and thereafter applying soluble silicate solution thereto and finally drying the mixture by heat above the boiling point of water but at such a low temperature as will not injuriously affect the pigment.

ZANVIL C. LOEBEL.